Nov. 19, 1957  J. T. ROBSON ET AL  2,813,305

METHOD OF VITREOUS COATING NON-METALLIC ARTICLES

Filed Sept. 13, 1956

*INVENTORS*
JAMES T. ROBSON and
HARVEY C. TUCKER

United States Patent Office 2,813,305
Patented Nov. 19, 1957

2,813,305
METHOD OF VITREOUS COATING NON-METALLIC ARTICLES

James T. Robson and Harvey C. Tucker, Cleveland Heights, Ohio, assignors, by mesne assignments, to United Cement Products Company, Wichita, Kans., a corporation of Kansas Application September 13, 1956, Serial No. 609,555

3 Claims. (Cl. 18—47.5)

This invention relates to a method of porcelain enameling and more particularly to the application of a coating of fused porcelain enamel or fritted glazes onto the surface of concrete building blocks and the like.

In the enameling of non-metallic objects, the nature of the material from which the same are made introduces difficulties not encountered in the enameling of metallic work-pieces. It is exceedingly more difficult to secure a continuous and uniform enameled finish coat on a non-metallic article, which is many times very rough, full of pores and gas occlusions and subject to deterioration under the influence of the heat employed in the fusing of the porcelain enamel or fritted glaze, whereas in the enameling of a metallic work-piece the object can be safely heated to the fusion temperature of the enamel and even higher without undergoing any substantial change.

Although many attempts have been made to apply a coating of fused porcelain enamel to articles made of hydraulic cement and the like, until the present invention no satisfactory commercial method has been produced. Concrete building blocks, concrete bricks and the like which have been coated with porcelain enamel or fritted glazes under prior art methods have become so weakened and degenerated as to make them entirely unsatisfactory for the purposes for which they are intended.

It is therefore a principal object of our invention to provide a method of forming a fused porcelain enamel or fritted glaze coating upon articles made of hydraulic cement in such a manner that the mechanical strength of the article is not impaired.

Another object is to provide a method for the enameling of non-metallic objects and by which a fused enamel finish coat may be secured which favorably compares with the type of finish secured on metallic work pieces.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated the present invention comprises a structural building element having a body comprising aggregate material and hydraulic cement and a fused vitreous coating on a surface of said body, said fused vitreous coating comprising an inner semi-vitrified portion and an outer glassy glaze portion having a maturing temperature of from about 800° F. to about 1300° F.

From the foregoing broad statement it will be seen that the concrete articles of the present invention have a coating thereon composed of two distinct portions and which coating is produced by a single fire. The inner portion when fired on the concrete article becomes a semi-vitrified body and the outer portion while being simultaneously fired on top of the inner coating becomes a glassy glaze. So that the distinctiveness of this coating can be fully appreciated and understood it is essential that the differences between the terms "vitrified" and "glass" are clearly understood.

One measure of the extent of glass formation in a given ceramic body is the amount of water the body will absorb. This is normally expressed in percentage of the original weight of the piece. Therefore, the percentage of water absorption of a ceramic body can be regarded as an indication of the degree of vitrification of that body. As a ceramic body is subjected to increasing temperatures the amount of vitrification increases and the percentage absorption simultaneously decreases until such time as the body has substantially zero absorption, at which time the ceramic body is termed "completely vitrified." When this state is attained, normally the body when fractured will be "stony" and will not be "glassy." At this stage the "flux" in the body has increased in volume by taking sufficient of the less refractory material, from the body, into solution to fill all pores and voids and completely surround the more refractory grains of the body. When a body of this nature is subjected to still higher temperatures the "flux" will gradually absorb substantially all of the refractory materials and at this point the resultant body is considered to be glass. Thus a fired ceramic body, to those skilled in the art, is either semi-vitrified, vitrified or glassy. A commercially available vitrified body, in the unglazed state will absorb less than ½% its weight in water. A commercial semi-vitrified body will absorb from about ½% to about 20% of its weight in water.

Thus from the foregoing it will readily be seen that the terms "vitrified" and "glass" are not synonymous.

In the following description of this invention, the type of article to which the invention is applicable will first be described, followed in sequence by a description of the manner in which the article should be conditioned in carrying out the process of this invention; the type of coatings which is believed suited in such process; and finally the actual steps employed, and the conditions to be observed in such process.

*The work body*

As previously indicated, the present invention is useful in the application of fused coatings onto non-metallic bodies. Thus the invention will be found to be particularly useful in the application of the above mentioned coatings on articles molded from hydraulic cement and aggregate. The aggregate may be any of the well known aggregate materials such as, expanded clay, shale (haydite), blast furnace slag, scoria, cinders and the like. The design and shape of the work body is immaterial, solid concrete brick or the various cored blocks may be coated satisfactorily when using the process of the invention. While the present process is intended to include and is applicable to cement blocks made of cement and sand without additional aggregate, in the preferred embodiment of the invention concrete blocks containing "recalcined" haydite aggregate are used.

It is well known that present day building blocks which use haydite aggregate, have the undesirable property of expanding upon picking up moisture and shrinking upon drying out, this is what is known as volume instability and causes cracking of the blocks. Shale which is expanded or heated to incipient fusion bloats and becomes what is known as haydite. This bloated shale or haydite is then used as a light-weight aggregate in concrete blocks and causes the aforementioned volume instability and consequent cracking. Further, building blocks containing expanded shale or clay aggregate when heated to the temperatures necessary for fusion of the coatings produces "popouts" or holes on the surface of the fired coating.

We have found that if the expanded shale or clay aggregate is recalcined to a temperature somewhat lower than the the original temperature used to form the aggregate and then incorporated into building blocks the resultant blocks have excellent volume stability and can be fired without producing "popouts" in the coating. We have found that recalcining the aggregate at about 700° F. is preferred. However, the important factor is to heat the aggregate below the temperature at which it will soften.

While the "recalcined" haydite block is preferred we may use concrete articles containing any of the other well known aggregate materials.

Figure 2:
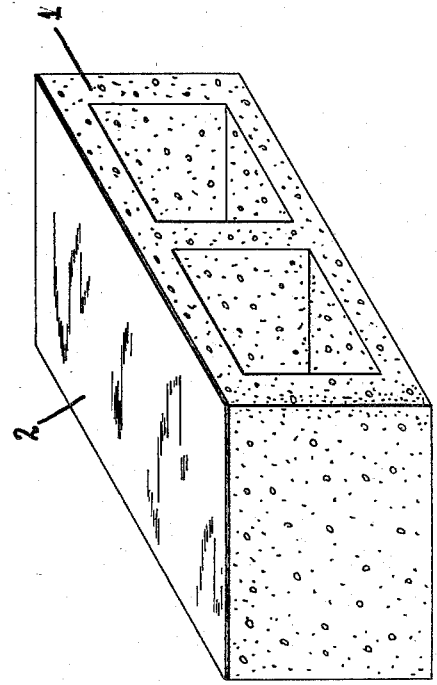
Fig. 2 is a perspective view of a coated structural building element which embodies the invention.

In Fig. 2, a coated block of concrete embodying the invention is shown, the block being one of the type commonly employed in building construction. The block comprises a body 1 of hydraulic cement and aggregate and a substantially impervious glassy coating 2 on one surface. It will be understood that such coating may be applied to one or more surfaces as desired.

So far as the block to be coated itself is concerned it is only necessary to add the recalcined or other aggregate with the hydraulic cement and make the block in the usual manner. Thus the coatings of the present invention are applied to commercially made and cured building elements.

The coating

As previously mentioned the coatings applied to the concrete block are composed of inner and outer portions which are simultaneously fused on a surface of the block.

The inner portion of the coating is a semi-vitrified body (having from about ½% to about 20% absorption) after firing at a temperature of from about 800° F. to about 1300° F. The inner portion of the coating is composed of a combination of flux material and refractory material just as any other semi-vitrified body. We have found that semi-vitrified bodies comprising from 30%–70% flux and from 70%–30% refractory and which mature at a temperature of from 800° F.–1300° F. are applicable to the present invention.

The following example is illustrative of the semi-vitrified bodies usable in the present invention:

I

| | Percent |
|---|---|
| Silica sand | 36 |
| Dehydrated borax | 30 |
| Litharge | 34 |

These ingredients comprise the flux portion of the semi-vitreous body and are smelted and fritted. The resultant frit is milled to a predetermined particle size and is then mechanically admixed with a refractory material or a combination of refractory materials such as silica sand, zircon sand, titanium sand, alumina, mica, clay or the like. A typical body usable in the present invention having a composition as follows:

| | Percent |
|---|---|
| Flux (such as shown above) | 60 |
| Mica | 10 |
| Clay | 10 |
| Milled zircon | 20 |

For the sake of clarity it will be reiterated here that the inner portion of the coating of the present invention comprises a semi-vitreous body and that the said semi-vitreous body comprises a flux portion and a refractory portion. The refractory materials are mechanically admixed with the fritted flux and are not to be confused with the raw batch ingredients of the flux which are subsequently smelted and fritted.

The foregoing example is given merely by way of illustration and should in no manner limit the invention. The only limiting factors are that the inner portion of the coating must be a semi-vitrified body comprising from 30%–70% flux and from 70%–30% refractory material and the composite body must mature at from about 800° F. to about 1300° F.

The purpose of the inner portion in our present invention is twofold. Most ceramic glazes, particularly those low in calcium, have a very high affinity for calcium and calcium compounds. Thus any ceramic glaze applied directly to the surface of a concrete block would have a tendency to react with the cement and would result in bubbling and blistering in the glaze. Therefore the inner portion of the coating acts to prevent the outer portion of the coating from reacting with the cement. Secondly, the inner portion of the coating acts to fill the voids in the normally rough surface of the concrete block whereby the outer portion of the coating is given a relatively smooth surface and the resultant fired coated block is substantially smooth and commercially acceptable.

The outer portion of the coating of the present invention comprises a glaze which at 800° F. to 1300° F. matures into a glass. This outer portion when applied over the inner portion and simultaneously fired therewith provides the concrete article with a smooth glassy substantially impervious and decorative surface. Any of innumerable well known glaze formulations may be used as the outer portion of the coating. The limiting factors being that the glaze must be substantially non-reactive with the inner portion and must mature into a glass at substantially the same temperature range the inner portion of the coat matures into a semi-vitrified body.

The glazes or outer portion of the coating which will be found particularly useful in carrying out the present invention are preferably those which are capable of best withstanding the conditions under which the finished article will be used. When, for example, a structural element is being made which will be exposed to the weather, a ceramic glaze which is particularly weather resistant will be found preferable. However, it must have a firing range of from about 800° F. to about 1300° F. As a specific example of such an enamel, the following may be given:

II

| | Percent |
|---|---|
| Silica sand | 48 |
| Dehydrated borax | 24 |
| Soda ash | 36 |
| Sodium nitrate | 7.5 |
| Fluorspar | 1.5 |
| Titania-silica mixture [1] | 36 |

[1] A mixture of one part titanium dioxide and two parts silicon dioxide.

III

| | Percent |
|---|---|
| Silica sand | 18.9 |
| Feldspar | 13.3 |
| Litharge | 67.8 |
| Copper oxide | 1.0 |

The ceramic glaze of Example III is a high lead glaze and contains copper oxide which produces a green glaze, whereas the glaze of Example II is leadless and is a white glaze.

Thus from the foregoing it will be seen that lead bearing or lead free glazes are applicable to the present invention and as stated previously substantially any ceramic glaze can be used providing it matures into a glass at from about 800° F. to 1300° F.

The outer portion of the coating should be free of refractory materials other than small amounts of extremely fine materials employed for pigmentation or opacification.

Applying the coating and firing the work

Figure 1:
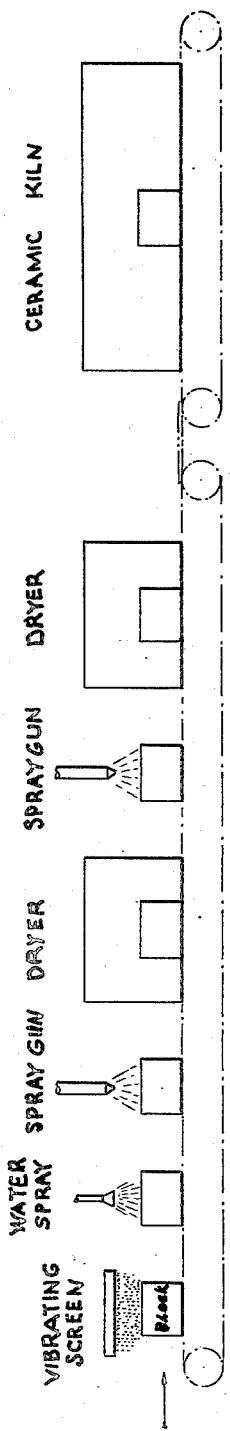
Fig. 1 is a flow sheet illustrating the preferred process of the invention.

Referring to Fig. 1 in the preferred method of carrying out the process of the present invention a properly cured and aged concrete block is passed under a vibrating screen where a relatively thin layer of the inner portion of the coating is evenly deposited on a surface of the block. The block then progresses underneath a waterspray which dampens the dry undercoating and allows it to expel trapped gases. The block then passes under a spray which is the same in composition as the original drycoat except that sufficient water has been added to make a sprayable slip. After this spraying, the coating is allowed to become partially dry and then it is passed under a spray containing the outer portion of the coating. This coating can be repeated for each surface of the block that it is desired to be coated. The coatings of the present invention are applied at a thickness of about $20/1000$ of an inch or about $1/10$ the thickness of prior art coatings. The block containing a coating on at least one surface thereof is first dried and then fired in a regular ceramic kiln with the burners on the sides as in standard ceramic firing.

The work pieces are preferably set back to back so as to give a gradual heat gradient throughout the pieces, consequently the pieces are not strained and do not crack as they are prone to do where the firing takes place at the top only as is the case in prior art processes.

We have found that in order to maintain a stable block or a block in which the mechanical strength has not been impaired it is desirable to maintain the lowest temperature on the block at about 800° F. and the maximum temperature on the surface at about 1300° F. The firing cycle ranges from about 4 hours to about 10 hours time. All other prior art processes have used much shorter times, on the order of several minutes, to keep the heat penetration into the block as low as possible. In the present process the article to be coated is slowly heated throughout its entire thickness and then allowed to gradually cool substantially to room temperature, the same as a ceramic body, to avoid strains.

The texture of the finished work piece may be either glossy or matte, and may be made with any of the available ceramic colors.

Tests conducted on concrete blocks coated according to the foregoing process show the compressive strength to be well above 1000 pounds per square inch, and more uniform in strength than unglazed blocks. The bond between the coating and the concrete is extremely good since blocks coated by the present process did not show spalling of the coatings when subjected to 15 inch of interior hydrostatic pressure for two months.

Other modes of applying the principle of the invention may be employed, change being made as regards the details described, provided the features stated in any of the following claims or the equivalent of such be employed.

We therefore particularly point out and distinctly claim as our invention:

1. The method of producing a coated structural building element having a body of hydraulic cement and aggregate, which comprises dusting a dry first coating to a surface of said building element, said first coating comprising a body which at a temperature of from about 800° F. to about 1300° F. matures into a semi-vitrified body having a water absorption of from about ½% to about 20%, spraying a water suspension of said unfired first coating over said dry dust coating, allowing said coating to partially dry, then spraying a second coating over said first coating, said second coating comprising a body which at a temperature of from about 800° F. to about 1300° F. matures into a glassy glaze having a water absorption of less than ½%, allowing said coated element to dry, slowly heating said coated article at from about 800° F. to about 1300° F. for about 4 to about 10 hours and then allowing the fired building element to slowly cool to substantially room temperature.

2. The method of producing a coated structural building element having a body of hydraulic cement and expanded shale aggregate which comprises calcining said expanded shale aggregate at a temperature below its softening point, combining the calcined aggregate with hydraulic cement, molding said combined cement and aggregate into a structural building element, curing and aging said molded element, applying a first coating to a surface of said cured element, said first coating comprising a body which at a temperature of from about 800° F. to about 1300° F. matures into a semi-vitrified body having a water absorption of from about ½% to about 20%, applying a second coating over said unfired first coating, said second coating comprising a body which at a temperature of from about 800° F. to about 1300° F. matures into a glassy glaze having a water absorption of less than ½%, slowly heated said coated article at from about 800° F. to about 1300° F. for about 4 to about 10 hours and then allowing the fired building element to slowly cool substantially to room temperature.

3. The method of producing a coated structural building element having a body of hydraulic cement and expanded shale aggregate which comprises calcining said expanded shale aggregate at a temperature below its softening point, combining the calcined aggregate with hydraulic cement, molding said combined cement and aggregate into a structural building element, curing and aging said molded element, dusting a dry first coating to a surface of said building element, said first coating comprising a body which at a temperature of from about 800° F. to about 1300° F. matures into a semi-vitrified body having a water absorption of from about ½% to about 20%, spraying a water suspension of said first coating over said dry dust coating, allowing said coating to partially dry, then spraying a second coating over said unfired first coating, said second coating comprising a body which at a temperature of from about 800° F. to about 1300° F. matures into a glassy glaze having a water absorption of less than ½%, allowing said coated element to dry, slowly heating said coated article at from about 800° F. to about 1300° F. for about 4 to about 10 hours and then allowing the fired building element to slowly cool to substantially room temperature.

References Cited in the file of this patent

UNITED STATES PATENTS

| Number | Name | Date |
|---|---|---|
| 479,021 | Rue | July 19, 1892 |
| 1,693,252 | Prouty | Nov. 27, 1928 |
| 1,900,833 | Maul et al. | Mar. 7, 1933 |
| 2,160,560 | Parkinson | May 30, 1939 |
| 2,579,050 | Ramsay | Dec. 18, 1951 |
| 2,602,758 | Olt | July 8, 1952 |
| 2,708,172 | Robson et al. | May 10, 1955 |
| 2,772,182 | Jessen | Nov. 27, 1956 |

FOREIGN PATENTS

| Number | Country | Date |
|---|---|---|
| 739,971 | Great Britain | Nov. 2, 1955 |